(12) United States Patent
Barkoczi

(10) Patent No.: US 8,644,008 B2
(45) Date of Patent: Feb. 4, 2014

(54) MODULAR HIGH VOLTAGE DISTRIBUTION UNIT FOR HYBRID AND ELECTRICAL VEHICLES

(75) Inventor: Roland Barkoczi, Pápa (HU)

(73) Assignee: MAGNA E-Car Systems GmbH & Co OG, Graz (AT)

( * ) Notice: Subject to any disclaimer, the term of this patent is extended or adjusted under 35 U.S.C. 154(b) by 409 days.

(21) Appl. No.: 13/031,792

(22) Filed: Feb. 22, 2011

(65) Prior Publication Data

US 2012/0212882 A1    Aug. 23, 2012

Related U.S. Application Data

(60) Provisional application No. 61/304,071, filed on Feb. 23, 2010.

(51) Int. Cl.
*H02B 1/20* (2006.01)

(52) U.S. Cl.
USPC ........... 361/637; 307/10.1; 361/641; 361/648

(58) Field of Classification Search
USPC ......................................................... 361/637
See application file for complete search history.

(56) References Cited

U.S. PATENT DOCUMENTS

| | | | |
|---|---|---|---|
| 4,599,680 A * | 7/1986 | Gibson et al. ............ | 361/679.31 |
| 4,956,747 A * | 9/1990 | Beer et al. ...................... | 361/728 |
| 5,504,655 A * | 4/1996 | Underwood et al. ......... | 361/707 |
| 5,745,338 A * | 4/1998 | Bartolo et al. ................ | 361/637 |
| 6,545,861 B1 * | 4/2003 | Hayes et al. .................. | 361/642 |
| 7,450,388 B2 * | 11/2008 | Beihoff et al. ................ | 361/715 |
| 8,294,293 B2 * | 10/2012 | Fukazu et al. ................ | 307/10.1 |
| 2006/0290689 A1 * | 12/2006 | Grant et al. .................... | 345/204 |

* cited by examiner

*Primary Examiner* — Gregory Thompson
(74) *Attorney, Agent, or Firm* — Jordan IP Law, LLC; Todd A. Vaughn

(57) ABSTRACT

A distribution unit has an incomer module disposed on the exterior of a battery casing and electrically connected to a battery housed within the casing, and a plurality of feeder modules electrically daisy-chained to the incomer module and configured to respectively distribute electrical power from the battery to a plurality of individual electrically powered devices.

25 Claims, 5 Drawing Sheets

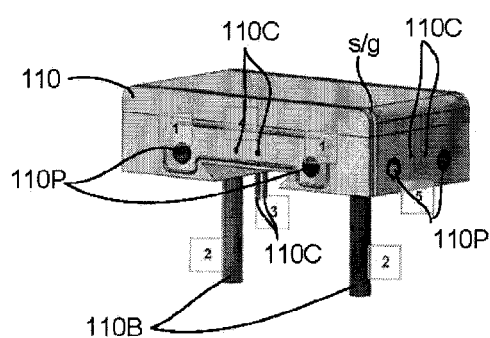
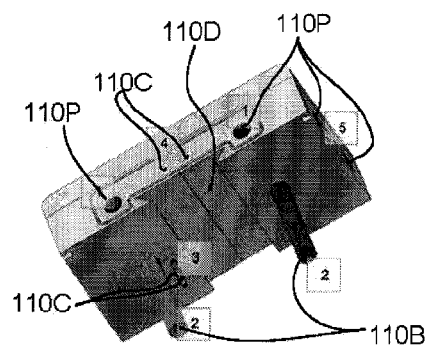
FIG. 3
FIG. 4
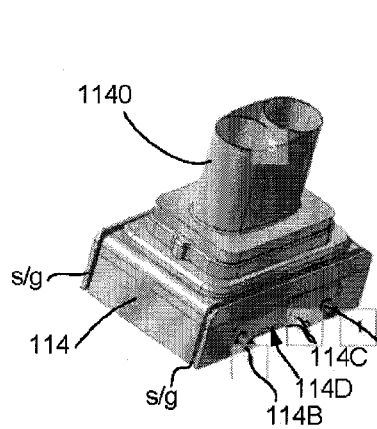
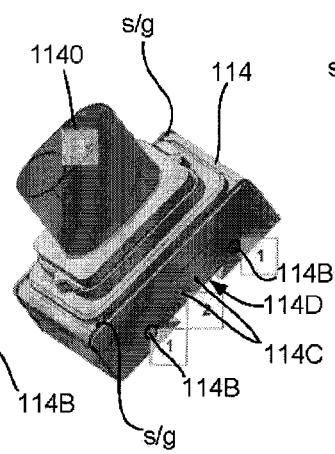
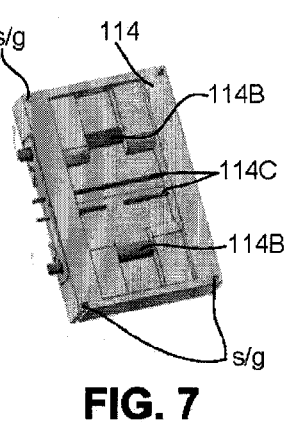
FIG. 5
FIG. 6
FIG. 7

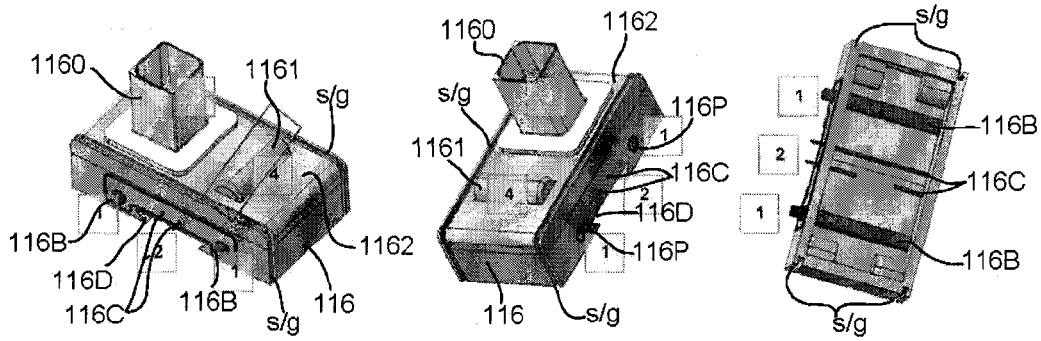
FIG. 8  FIG. 9  FIG. 10
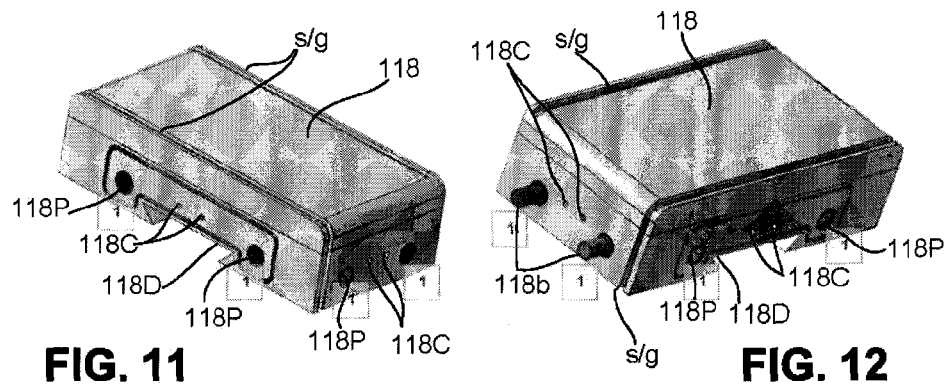
FIG. 11  FIG. 12
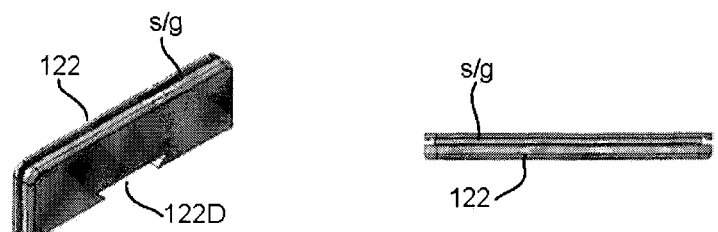
FIG. 13  FIG. 14

MODULAR HIGH VOLTAGE DISTRIBUTION UNIT FOR HYBRID AND ELECTRICAL VEHICLES

CROSS-REFERENCE TO RELATED APPLICATIONS

The present application claims priority under 35 U.S.C. §119 to U.S. Provisional Patent Application No. 61/304,071 (filed on Feb. 23, 2010), which is hereby incorporated by reference in its entirety.

BACKGROUND OF THE INVENTION

For battery powered arrangements where a battery is used to supply power to a number of different devices such as in hybrid and/or electrically-powered vehicles, one problem is that during the battery design phase the spatial locations and cut-outs for the individual connectors and fuses must be designed individually, i.e., one-by-one. Secondly, for each connector, wiring is required within the battery housing, which may lead to increased complexity and manufacturing cost of the battery unit. A third drawback is that it is necessary to guarantee package space on the surface of the battery casing/housing for the connections so as to allow for the various devices to be plugged in. A further disadvantage reside in the maintenance of the arrangement. Accessible fuses are necessary for each of the devices that are to be powered by the battery and measures must be taken to avoid the potential problem wherein fuse replacement may be attempted with the associated device still plugged in.

SUMMARY OF THE INVENTION

Embodiments relate to an arrangement which enables electrical power to be distributed from a battery to a plurality of different devices which are powered thereby. More specifically, embodiments relate to a modular arrangement which is readily installed and is selectively expandable so as to allow for ready adaptation to different environments/situations such as those found in different motor vehicles and the like.

Embodiments relate to an arrangement which simplifies the interconnection of a battery and different devices which operate on the power supplied by the battery. Such embodiments enable the connection set up to be selectively modified in accordance with a change in the number and/or type of devices which require power from the battery.

In accordance with embodiments, a connection unit configured for disposition on a battery casing and for connecting the battery within the battery casing to a plurality of electrically powered devices disposed externally of the battery casing, that may include at least one of the following: an incomer module configured to be disposed on and/or over an external surface of the battery casing and to be in electrically connected to the battery so as to be supplied with electrical power therefrom; a first feeder module configured to abut and to be electrically connected with the incomer module; and a second feeder module which configured to abut and to be electrically connected with the first feeder, the incomer and first and second feeders being configured so that power from the battery is available at the first and second feeders via the daisy chain arrangement.

In accordance with embodiments, a distribution unit is provided to distribute electrical power from a battery of one of an electric vehicle and a hybrid vehicle to electrically powered devices of the one of an electric vehicle and a hybrid vehicle, the distribution unit including at least one of: a first distribution unit column including a first fixing plate connected to the battery, an incomer module connected to the first fixing plate and electrically connected to the battery, and a plurality of first current feeder modules aligned in series with and electrically connected to the incomer module and also electrically connected to the electrically powered devices; and a second distribution unit column extending parallel to the first distribution unit column and including a second fixing plate connected to the battery, a column starter connected to the second fixing plate and electrically connected to the incomer module, and a plurality of second current feeder modules aligned in series with and electrically connected to the column starter and also electrically connected to the electrically powered devices.

In accordance with embodiments, a distribution unit is provided for distributing electrical power from a battery to electrically powered devices, the distribution unit including at least one of the following: a first distribution unit column for distributing electrical power from the battery to at least one of the electrically powered devices, the first distribution unit column including a first module including a first bus connection interface, a second bus connection interface and first module bus bars extending from the first module to electrical connect the first module to the battery; and at least one first feeder module electrically connected to the first module at the first connection interface; and a second distribution unit column for distributing electrical power from the battery to at least one of the electrically powered devices, the second distribution unit column including a column starter including a third bus connection interface and column starter bus bars which electrically connect the column starter to the first module at the second bus connection interface, and at least one second feeder module electrically connected to the column starter at the third bus connection interface.

In accordance with embodiments, a high voltage distribution unit is provided for distributing electrical power from a battery to electrically powered devices, the high voltage distribution unit including at least one of the following: a first fixing plate provided at a surface of the battery; an incomer module having an opening at a bottom surface thereof which receives the first fixing plate to thereby removeably connect the incomer module to the first fixing plate, the incomer module having incomer module bus bars which electrically connect the incomer module to the battery; and a plurality of first current feeder modules electrically connected at a first connection area to the incomer module and at a second connection area to the electrically powered devices, the first current feeder modules each having an opening at a bottom surface thereof which receives the first fixing plate to thereby removeably connect the first current feeder modules to the first fixing plate such that the first current feeder modules are aligned in series with the incomer module.

In accordance with embodiments, the first feeder is configured for high current distribution, while the second feeder module is configured for low current distribution. In these instances, the incomer module and the first and second feeder modules each have a bus bar structure disposed therein, bus bars of the bus bar structure being arranged so that they can be connected to one another to establish a bus arrangement from which electrical power can be tapped from each feeder module.

In accordance with embodiments, the incomer module and the first and second feeder modules each have interlock connections disposed therein, the interlock connections being arranged for interconnection with one anther to establish an interlock circuit.

In accordance with embodiments, in order to endow flexibility, the connection unit further comprises a column starter module which is configured to interconnect with the incomer module; a third feeder module configured to interconnect with the column starter module; and a fourth feeder module configured to interconnect with the third feeder module. In this instance the third feeder module is configured for high current distribution, while the fourth feeder module is configured for a lower current distribution.

In accordance with embodiments, to facilitate connection of the modules to the battery casing, the connection unit may also include at least one of the following: a first fixing plate secured to the battery housing, the first and second feeder modules being configured to be slidably disposed on the first fixing plate so as to slide or otherwise move along the first fixing plate so that the first feeder module abuts or otherwise physically contacts the incomer module and the bus bar structures therein interconnect, and further so that the second feeder module abuts the first feeder module and the bus bar structures therein interconnect. If required, a second fixing plate is secured, connected or attached to the battery housing, and the third and fourth feeder modules are configured to be slidably and/or moveably disposed on the second fixing plate so as to slide and/or move therealong so that the third feeder module abuts the column starter module and the bus bar structures therein interconnect, and further so that the fourth feeder module abuts or otherwise physically contacts the third feeder module and the bus bar structures therein interconnect.

In accordance with embodiments, the second feeder module has a fuse incorporated therein, the fuse being accessible while the feeder module is interconnected with the incomer module and slidably and/or moveably mounted on the first fixing plate. Similarly the fourth feeder module has a fuse incorporated therein, the fuse being accessible while the fourth feeder module is interconnected with the column starter module and slidably and/or moveably mounted on the second fixing plate.

In accordance with embodiments, a connection unit may include at least one of the following: an incomer module disposed on the exterior of a battery casing and electrically connected with a battery housed within the casing; a plurality of feeder modules electrically daisy-chained with the incomer module, disposed on the exterior of the battery casing, and configured to respectively distribute electrical power from the battery to a first plurality of individual electrically powered devices.

In accordance with embodiments, a fixing plate is attached to the battery casing for supporting the plurality of feeder modules in a predetermined aligned configuration with respect to the incomer module. A lower surface of each of the first plurality of feeder modules is formed with a dove-tailed groove and wherein the first fixing plate is elongate and has a dove-tail cross section.

In accordance with embodiments, in order to increase either layout flexibility or to increase the number of modules available for connection a column starter module is provided and configured for connection to a side of the incomer module in a manner which establishes an electrical connection with battery. A second plurality of feeder modules may be daisy-chained to the column starter module and respectively configured to distribute electrical power from the battery to a second plurality of electrically powered devices.

In accordance with embodiments, a second fixing plate is attached to the battery casing for supporting the second plurality of feeder modules in a predetermined aligned configuration with respect to the column starter module. Similar to the above described embodiment, this arrangement can also make use of an arrangement wherein a lower surface of each of the second plurality of feeder modules is formed with a dove-tailed groove and wherein the second fixing plate is elongate and has a dove-tail cross section.

BRIEF DESCRIPTION OF THE DRAWINGS

Example

Example

Example FIGS. 3 and 4 illustrate an incomer module in accordance with embodiments as illustrated in example FIG. 2.

Example FIGS. 5 and 6 illustrate a high current feeder in accordance with embodiments as illustrated in example FIG. 2.

Example FIG. 7 illustrates a high current feed module having an exposed upper part to reveal details of the bus and interlock arrangements.

Example FIGS. 8 and 9 illustrate a low current-type feeder module in accordance with embodiments as illustrated in example FIG. 2.

Example FIG. 10 illustrates a low current feeder module having an exposed upper part to reveal inner components thereof.

Example FIGS. 11 and 12 illustrate a column starter module in accordance with embodiments as illustrated in example FIG. 2.

Example FIGS. 13 to 16 illustrate a termination unit in accordance with embodiments.

Example

DETAILED DESCRIPTION OF EMBODIMENTS

Figure 1:
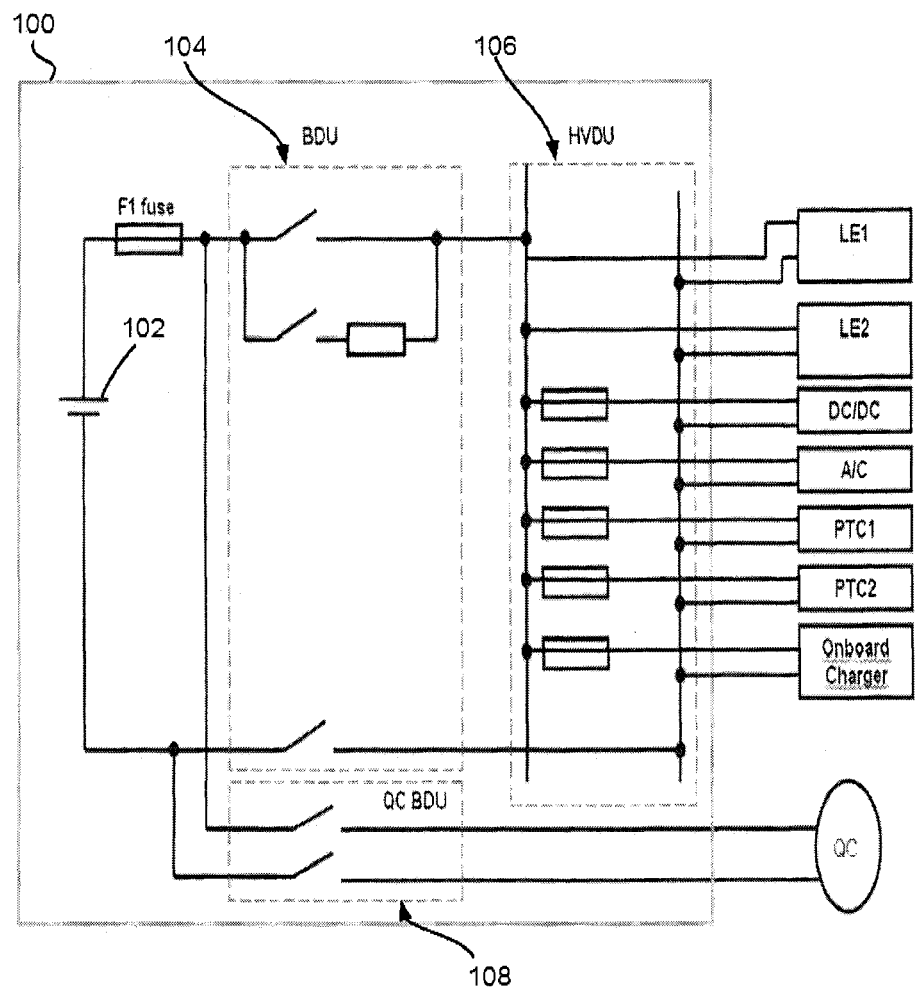
FIG. 1 illustrates a circuit diagram schematically depicting a battery casing which houses a high voltage battery, a battery disconnection unit (BDU) and a high voltage distribution unit (HVDU), and outboard devices that are powered/associated therewith.

Example FIG. 1 illustrates a circuit arrangement of a battery system including battery casing 100 enclosing high voltage battery 102, battery disconnection unit (BDU) 104, high voltage distribution unit (HVDU) 106 and quick charge battery disconnection unit (QC BDU) 108. These arrangements are electrically connected or otherwise circuited in the illustrated manner with outboard devices LE1, LE2, DC/DC, A/C, PTC1, PTC2 and an onboard charger device. The QC BDU 108 is arranged to be connected with a quick charge device QC. Fuses are arranged in BDU and HVDU in the illustrated manner. High voltage battery 102 may be, for example, a battery capable of outputting 200-500 volts. Embodiments which are illustrated in example FIG. 1 are exemplary and not limiting to the scope thereof. Accordingly, embodiments may encompass modifications thereof.

In battery arrangements, battery casing 100 may require cabling and structure to enable the circuitry illustrated in example FIG. 1, and permit a predetermined set number of outboard devices to connected (e.g., plugged in) and supplied with electrical power from battery 102. In accordance with embodiments, however, battery 100 casing is simplified by obviating the need for an inboard HVDU, and allowing at least this unit to be effectively taken out of battery casing 100 and disposed on and/or over its external surface. Embodiments also allow for design flexibility and ready adaptation to different requirements and/or environments whereby a different number of outboard devices and/or a different mixture of high and lower current usage devices require electrical connection to battery 102.

Figure 2:
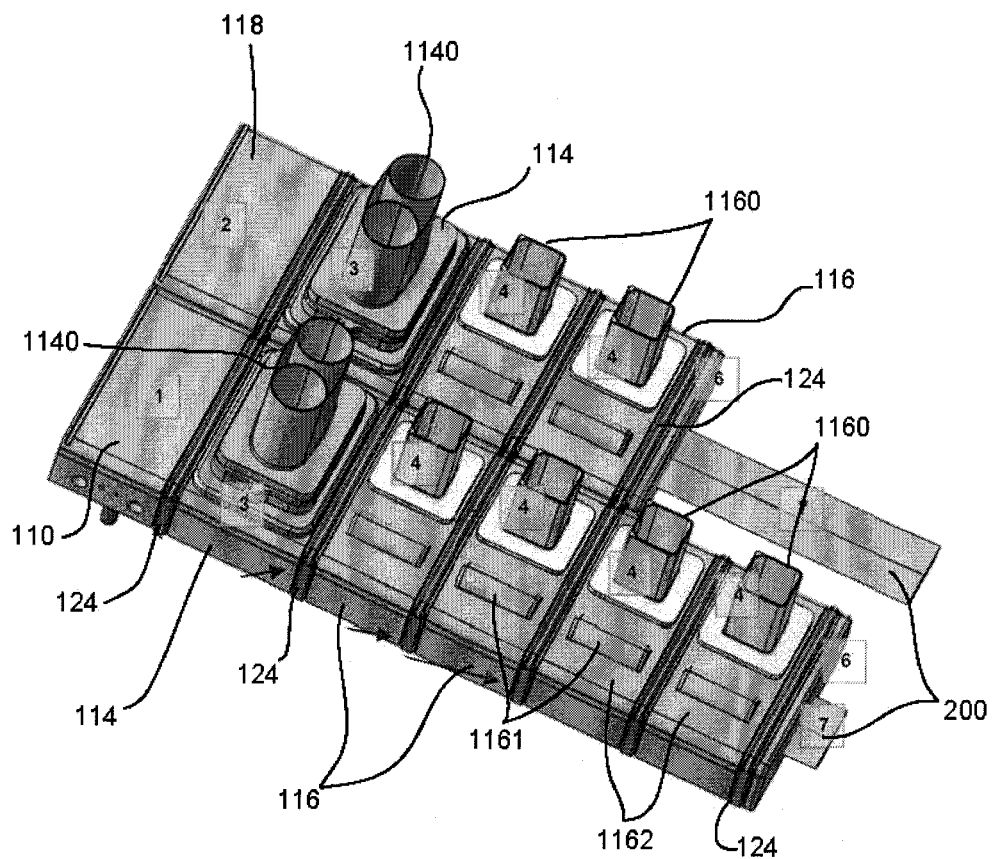
FIG. 2 illustrates a perspective view of embodiments that employs a plurality of modules which are plugged together.
Figure 15:
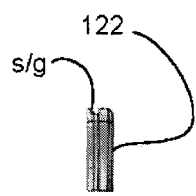
Figure 16:
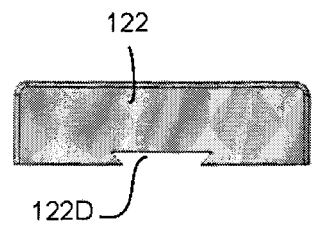
Figure 17:
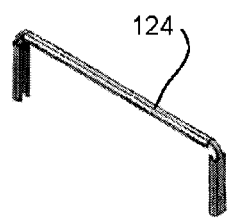
FIGS. 17 to 20 illustrate a fastener unit used to secure interplugged modules together, in accordance with embodiments.
Figure 18:
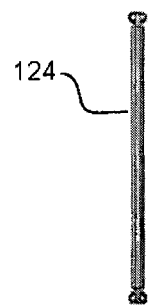
Figure 19:
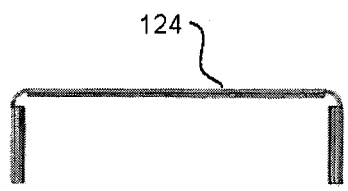
Figure 20:
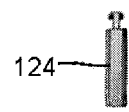

As illustrated in example FIGS. 2 and 3, incomer module 110 is provided and includes bus arrangements 110B, 110C that extend into battery casing 100 and enables an electrical connection to battery 102. Such an electrical connection to the battery can be achieved by way of BDU 104, for example. Bus arrangements 110B, 110C may include a pair of bus extensions which extend in a direction perpendicular to the bottom surface of incomer modular 110.

Incomer module 110 may include bus connection ports 110P on at least two adjacent sidewalls to enable feeder modules 114, 116 as illustrated in example FIGS. 5-10 to be received therein and thereby plug into incomer 110 at one or more sides. Incomer module 110 may be arranged to cooperate with column starter module 118 which also includes bus arrangements and connection ports 118B, 118C, 118P that allows a parallel row of feeder modules 114, 116 to be interconnected in a manner which establishes a second column of daisy-chained modules in the illustrated manner. However, it should be noted that embodiments are not limited to this arrangement, for instance, incomer module 110 can be configured to be positioned centrally with respect to the other modules to have feeder modules 114, 116 extend out from four sidewalls (and/or the bottom and top surfaces) of incomer module 110.

Feeder modules 110 may be classified into at least two different types: high current feeders 114 such as depicted in example FIGS. 5-7 and/or low current feeders 116 such as depicted in example FIGS. 8-10. High current feeder modules 114 may be provided with multi-pin connectors 1140 while low current feeder modules 116 may be provided with HV connectors 1160. These different connection features enable instant recognition as to which devices any one feeder module is intended to be connected.

In accordance embodiments, low current feeder modules 116 may be provided with a changeable fuse that can be readily accessed due to the their location in fuse boxes 1161 on and/or over the top of the module which is located on and/or battery casing 100. However, it is within the scope of embodiments to arrange for the fuses to be accessible only after removing cover 1162 of respective low current feeder module 116. This cover removal requirement ensures that the plugged connection in HV connector 1160 be removed before cover 1162 can be removed and the actual fuse replacement can be carried out.

As illustrated in example FIGS. 7 and 10, high current feeder modules 114 and low current feeder modules 116 are provided such that bus structures 114B, 114C, 116B, 116C therein extends therethrough in a manner which allows the modules to be plugged into each other along with interlock circuitry. The manner in which the modules can be daisy-chained is self-evident.

In order to support modules 110, 114, 116 and 118 in a daisy-chained manner, each module 110, 114, 116 and 118 is arranged for support on parallel extending fixing plates 200. Fixing plates 200 can be fastened or fixed to the surface of battery casing 100. Each module 110, 114, 116 and 118 has at the lower surface thereof a dove-tail shaped recess 110D, 114D, 116D and 118D. Fixing plates 200 are elongate and have a rectangular cross-section that corresponds to and mates with dove-tailed shaped recess 110D, 114D, 116D and 118D.

With this configuration the appropriate combination of modules 110, 114, 116 and 118 can be pre-assembled by sliding them along the upper surface of a respective fixing plate 200 until they abut and establish the required bus/interlock interconnections. Using this type of assembly, modules 110, 114, 116 and 118 can be positioned on battery casing 100 to enable the bus connections of incomer module 110 to become electrically connected with battery 102 or its associated circuitry by securing fixing plates 200 to battery casing 100. If a second column of modules 110, 114, 116 and 118 is required in the manner illustrated in example FIG. 2, then a column starter module 118 is plugged into a side of incomer module 110 and a second fixing plate 200 slid into position. Thereafter, an appropriate series of feeder modules 114, 116 are slid into position. The first and second fixing plates 200 can then be connected to battery casing 100.

In order to close off the exposed end of the last feeder module (e.g., module 114) on any given column that is assembled, rather than providing a particular type of feeder module 114, 116 which is not provided with bus receiving ports, termination plate 122 may be provided which slides into position along the appropriate fixing plate 200 until it abuts the last of the feeder modules 114, 116. As illustrated in example FIG. 13, termination plate 122 has dove-tail shaped recess 122D at a bottom portion thereof that is received by fixing plate 200.

As illustrated in example FIG. 14, in order to maintain the respective modules in the snug abutting condition necessary to maintain the electrical interconnection, daisy-chaining unit fasters or clips 124 may be used, for example, to clip modules 110, 114, 116 and 118 together. Moreover, clips 124 are provided in order that the area between the different distribution units (modules 110, 114, 116 and 118) are adequately sealed, for example, to provide an IP6k9k-type seal. In such a seal, 6K denotes dustproof while 9K denotes resistant to high-pressure/steam cleaning. Clips 124 may be arranged to fit into grooves s/g that are formed along the peripheral sidewalls and uppermost surface of respective modules 110, 114, 116 and 118 and termination plate 122. Clip 124, therefore, ensure that the interface between one distribution module 110, 114, 116 and 118 and an adjacent distribution module 110, 114, 116 and 118 will not receive undesirable moisture, dust, particles, etc. in the contacting area. The structural geometries of clip 124 and modules 110, 114, 116 and 118 is defined in that way that the sealing between the distribution modules 110, 114, 116 and 118 will get pressed during the fixing of clip 124.

Embodiments a modular HV distribution unit is provided that enables electrical connection between a battery and a plurality of different electrical units via input and output modules which are configured to mounted on an exterior of the battery casing. Each module includes a busbar arrangement that permit for a plug in-type of electrical connection between the modules as well as for power outlet features. Electrical devices can be plugged into such power outlet features. The modules can be slid onto a fixing plate and held in place by connector elements which interconnect adjacent modules. This allows for ready adaptation of the battery to different vehicles or the like wherein different connection requirements are encountered. Cost reduction, and easy adaption to different battery design and sizes, is thus enabled.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A distribution unit adapted for distributing electrical power from a battery to at least one electrically powered device, the distribution unit comprising:
 a first distribution unit column for distributing electrical power from the battery to the at least one electrically powered device, the first distribution unit column including:
  a first module including a first bus connection interface, a second bus connection interface and first module bus bars extending from the first module to electrical connect the first module to the battery; and
  at least one first feeder module electrically connected to the first module at the first connection interface;
 a first module fastener which mechanically connects the at least one first feeder module to the first module at the first connection interface.

2. The distribution unit of claim 1, further comprising:
 a second distribution unit column for distributing electrical power from the battery to at least one of the electrically powered devices, the second distribution unit column including:
  a column starter including a third bus connection interface and column starter bus bars which electrically connect the column starter to the first module at the second bus connection interface; and
  at least one second feeder module electrically connected to the column starter at the third bus connection interface.

3. The distribution unit of claim 2, further comprising:
 a second module fastener which mechanically connects the at least one second feeder module to the column starter.

4. The distribution unit of claim 2, further comprising:
 a first fixing plate attached to the battery; and
 a second fixing plate attached to the battery which extends in a direction parallel to the first fixing plate.

5. The distribution unit of claim 4, wherein the bottom surface of the first module has an opening which receives the first fixing plate to thereby removeably connect the first module to the first fixing plate.

6. The distribution unit of claim 5, wherein the opening has a dovetail cross-section.

7. The distribution unit of claim 4, wherein the bottom surface of the at least one first feeder module has an opening which receives the first fixing plate to thereby removeably connect the at least one first feeder module to the first fixing plate.

8. The distribution unit of claim 7, wherein the opening has a dovetail cross-section.

9. The distribution unit of claim 4, wherein the bottom surface of the column starter has an opening which receives the second fixing plate to thereby removeably connect the column starter to the second fixing plate.

10. The distribution unit of claim 9, wherein the opening has a dovetail cross-section.

11. The distribution unit of claim 4, wherein the bottom surface of the at least one second feeder module has an opening which receives the second fixing plate to thereby removeably connect the at least one second feeder module to the second fixing plate.

12. The distribution unit of claim 11, wherein the opening has a dovetail cross-section.

13. The distribution unit of claim 1, wherein the first bus connection interface of the first module includes first bus connection ports adapted to receive corresponding bus bars of the at least one first feeder module to electrically connect the first module to the at least one first feeder module.

14. The distribution unit of claim 2, wherein the second bus connection interface of the first module includes second bus connection ports adapted to receive corresponding bus bars of the column starter to electrically connect the first module to the column starter.

15. The distribution unit of claim 2, wherein the at least one first feeder module and the at least one second feeder each comprise at least one of a high current feeder and a low current feeder, respectively.

16. The distribution unit of claim 2, wherein the at least one first feeder module and the at least one second feeder each have at least pin connector for facilitating an electrical connection between the at least one first feeder module and the at least one second feeder and a respective electrically powered device.

17. The distribution unit of claim 2, further comprising:
 a first termination unit provided at the distal end of the first distribution unit column to shield and seal an exposed surface of a last one of the at least one first feeder module; and
 a second termination unit provided at the distal end of the second distribution unit column to shield and seal an exposed surface of a last one of the at least one second feeder module.

18. A high voltage distribution unit adapted for distributing electrical power from a battery to at least one electrically powered device, the high voltage distribution unit comprising:
 a first fixing plate provided at a surface of the battery;
 an incomer module having an opening at a bottom surface thereof which receives the first fixing plate to thereby removeably connect the incomer module to the first fixing plate, the incomer module having incomer module bus bars which electrically connect the incomer module to the battery; and
 a plurality of first current feeder modules electrically connected at a first connection area to the incomer module and at a second connection area to the electrically powered devices, the first current feeder modules each having an opening at a bottom surface thereof which receives the first fixing plate to thereby removeably connect the first current feeder modules to the first fixing plate such that the first current feeder modules are aligned in series with the incomer module.

19. The high voltage distribution unit of claim 18, wherein the first current feeder modules comprise at least one high current feeder and at least one low current feeder.

20. The high voltage distribution unit of claim 18, further comprising:
 a first module fastener which mechanically connects the incomer module to an adjacent one of the first current feeder modules and also connects adjacent first current feeder modules to each other.

21. The high voltage distribution unit of claim 20, wherein the first module fastener seals a space between the incomer module and an adjacent one of the first current feeder modules and also a space between adjacent first current feeder modules.

22. The high voltage distribution unit of claim 18, further comprising:
 a second fixing plate attached to the battery which extends in a direction parallel to the first fixing plate;
 a column starter having an opening at a bottom surface thereof which receives the second fixing plate to thereby removeably connect the column starter to the second fixing plate, the column starter having column starter bus bars which electrically connect the column starter to the first module; and a plurality of second current feeder modules electrically connected at a third connection point to the column starter and at a fourth point to the electrically powered devices, the second current feeder modules each having an opening at a bottom surface thereof which receives the second fixing plate to thereby removeably connect the second current feeder modules to the second fixing plate such that the second current feeder modules are aligned in series with the current starter.

23. The high voltage distribution unit of claim 22, wherein the second current feeder modules comprise at least one high current feeder and at least one low current feeder.

24. A distribution unit which distributes electrical power from a battery of one of an electric vehicle and a hybrid vehicle to electrically powered devices of the one of the electric vehicle and the hybrid vehicle, the distribution unit comprising:

a first distribution unit column including a first fixing plate connected to the battery, an incomer module connected to the first fixing plate and electrically connected to the battery, and a plurality of first current feeder modules aligned in series with and electrically connected to the incomer module and also electrically connected to the electrically powered devices.

25. The distribution unit of claim 24, further comprising:

a second distribution unit column extending parallel to the first distribution unit column and including a second fixing plate connected to the battery, a column starter connected to the second fixing plate and electrically connected to the incomer module, and a plurality of second current feeder modules aligned in series with and electrically connected to the column starter and also electrically connected to the electrically powered devices.

* * * * *